(12) United States Patent
Sakata (10) Patent No.: US 8,622,354 B2
(45) Date of Patent: Jan. 7, 2014

(54) DISPLAY

(75) Inventor: Tatsuya Sakata, Tokyo (JP)

(73) Assignee: Sony Corporation (JP)

( * ) Notice: Subject to any disclaimer, the term of this patent is extended or adjusted under 35 U.S.C. 154(b) by 26 days.

(21) Appl. No.: 13/232,061

(22) Filed: Sep. 14, 2011

(65) Prior Publication Data

US 2012/0075783 A1 Mar. 29, 2012

(30) Foreign Application Priority Data

Sep. 24, 2010 (JP) ................ P2010-214274

(51) Int. Cl.
*A47F 5/12* (2006.01)
*F16M 13/00* (2006.01)
*G06F 1/16* (2006.01)

(52) U.S. Cl.
USPC ....... 248/133; 248/521; 248/919; 361/679.22

(58) Field of Classification Search
USPC .............. 248/133, 454, 514, 515, 521, 122.1, 248/125.1, 125.7, 125.9, 126, 159, 188.2, 248/200.1, 219.2, 223.41, 349.1, 919; 361/679.22
See application file for complete search history.

(56) References Cited

U.S. PATENT DOCUMENTS

| 176,905 | A | * | 5/1876 | Walton | 248/515 |
| 695,022 | A | * | 3/1902 | Albertson | 285/185 |
| 782,816 | A | * | 2/1905 | Becker | 248/645 |
| 834,695 | A | * | 10/1906 | Wellman | 248/558 |
| 2,557,507 | A | * | 6/1951 | Lang, Jr. | 285/153.2 |
| 4,034,946 | A | * | 7/1977 | Zimmer, Jr. | 248/183.2 |
| 4,603,246 | A | * | 7/1986 | Costa | 392/385 |
| 4,754,945 | A | * | 7/1988 | Diamond | 248/460 |
| 4,759,240 | A | * | 7/1988 | Lin | 81/177.8 |
| 4,872,630 | A | * | 10/1989 | Cooper | 248/278.1 |
| D337,333 | S | * | 7/1993 | Turk | D14/251 |
| 5,641,236 | A | * | 6/1997 | Hornung et al. | 403/171 |
| 5,815,875 | A | * | 10/1998 | Yamada | 15/167.1 |
| 6,257,799 | B1 | * | 7/2001 | Ribe | 403/402 |
| 6,378,830 | B1 | * | 4/2002 | Lu | 248/278.1 |
| 6,595,481 | B1 | * | 7/2003 | Huang et al. | 248/349.1 |
| 6,957,832 | B1 | * | 10/2005 | Pannekoek | 285/184 |
| 7,088,577 | B2 | * | 8/2006 | Lauffer et al. | 361/679.21 |
| 7,130,186 | B2 | * | 10/2006 | Yu | 361/679.27 |
| 7,237,755 | B2 | * | 7/2007 | Cho et al. | 248/274.1 |
| 7,434,496 | B2 | * | 10/2008 | Hu | 81/177.7 |
| 7,522,047 | B2 | * | 4/2009 | Belden et al. | 340/568.1 |

(Continued)

FOREIGN PATENT DOCUMENTS

JP 3068198 U 4/2000

*Primary Examiner* — Joshua J Michener
*Assistant Examiner* — Chiedu Chibogu
(74) *Attorney, Agent, or Firm* — Lerner, David, Littenberg, Krumholz & Mentlik, LLP (57) ABSTRACT

A display includes: a display section; and a supporting section including a post and a base and supporting the display section. The post includes: a tubular upper post extending in a direction perpendicular to a horizontal plane; a tubular lower post separated from the upper post at a separating plane tilted with respect to the horizontal plane and having a variable mounting angle with respect to the upper post by rotating around a central line of the upper post on the separating plane; and a tilt mechanism disposed on a side opposite to the separating plane of the upper post and changing a tilt angle in an elevation direction of the display section. A tilt angle $\alpha$ with respect to the horizontal plane of the separating plane satisfies $\alpha=45°-(\theta/2)$, where $\theta$ is a maximum tilt angle of the display section by the tilt mechanism.

5 Claims, 12 Drawing Sheets

(56) References Cited

U.S. PATENT DOCUMENTS

| | | | |
|---|---|---|---|
| 7,753,329 B2 * | 7/2010 | Hanson et al. | 248/278.1 |
| 7,789,362 B2 * | 9/2010 | Choi | 248/276.1 |
| 7,832,910 B2 * | 11/2010 | Kauffman | 362/414 |
| D629,405 S * | 12/2010 | Crysell | D14/447 |
| 7,889,486 B2 * | 2/2011 | Chiang et al. | 361/679.22 |
| 8,066,241 B2 * | 11/2011 | Yu et al. | 248/286.1 |
| 8,151,660 B2 * | 4/2012 | Wood | 74/55 |
| 2007/0063115 A1 * | 3/2007 | Ye | 248/231.61 |

* cited by examiner

DISPLAY

CROSS-REFERENCE TO RELATED APPLICATION

The present application claims priority from Japanese Patent Application No. JP 2010-214274 filed in the Japanese Patent Office on Sept. 24, 2010, the entire content of which is incorporated herein by reference.

BACKGROUND

The present technology relates to a display such as a television.

Liquid crystal displays allowed to be installed on both of a wall and a table with use of a common component have been proposed (for example, refer to Japanese Utility Model Registration No. 3068198).

SUMMARY

However, to convert such a liquid crystal display in related art from wall-mount installation to desktop installation, and vice versa, there is an issue that it is necessary to disassemble and reassemble a base, thereby complicating work.

It is desirable to provide a display which is convertible between wall-mount installation and desktop installation by simple work.

According to an embodiment of the technology, there is provided a display including: a display section; and a supporting section including a post and a base and supporting the display section, in which the post includes: a tubular upper post extending in a direction perpendicular to a horizontal plane; a tubular lower post separated from the upper post at a separating plane tilted with respect to the horizontal plane and having a variable mounting angle with respect to the upper post by rotating around a central line of the upper post on the separating plane; and a tilt mechanism disposed on a side opposite to the separating plane of the upper post and changing a tilt angle in an elevation direction of the display section, and a tilt angle α with respect to the horizontal plane of the separating plane satisfies $\alpha=45°-(\theta/2)$, where θ is a maximum tilt angle of the display section by the tilt mechanism.

The display according to the embodiment of the technology is convertible between wall-mount installation and desktop installation by rotating the lower post around the central line of the upper post on the separating plane to change a mounting angle with respect to the upper post of the lower post. Moreover, the tilt angle α with respect to the horizontal plane of the separating plane satisfies $\alpha=45°-(\theta/2)$, where θ is the maximum tilt angle of the display section by the tilt mechanism; therefore, while the display section is tilted at the tilt angle θ by the tilt mechanism in desktop installation, the tilt angle of the display section is 0° in wall-mount installation. Therefore, when the display is converted from desktop installation to wall-mount installation, and vice versa, it is not necessary to adjust the tilt angle of the display section by the tilt mechanism.

In the display according to the embodiment of the technology, the post is separated into the upper post and the lower post at the separating plane tilted with respect to the horizontal plane, and the mounting angle with respect to the upper post of the lower post is variable, and the tilt angle α with respect to the horizontal plane of the separating plane satisfies $\alpha=45°-(\theta/2)$, where θ is the maximum tilt angle of the display section by the tilt mechanism. Therefore, the display is convertible between wall-mount installation and desktop installation by simple work.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION OF THE PREFERRED EMBODIMENTS

A preferred embodiment of the technology will be described in detail below referring to the accompanying drawings.

Figure 1:
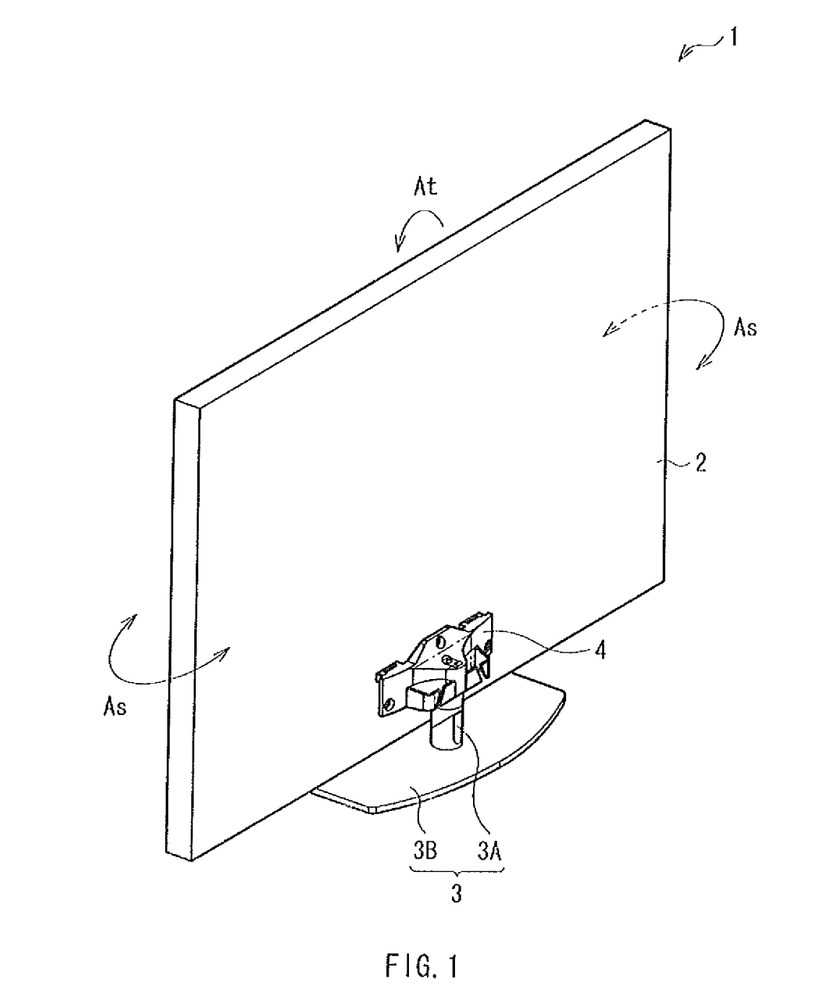
FIG. 1 is a perspective view illustrating an appearance of a display according to an embodiment of the technology when viewed from a back side thereof.

FIG. 1 illustrates an appearance of a display (television) according to an embodiment of the technology when viewed from a back side thereof. A display 1 has, for example, a configuration in which a display section 2 for image display is supported by a supporting section 3. The display section 2 is a flat display panel using a display element such as a liquid crystal, plasma, organic EL, inorganic EL, electrodeposition or electrochromic display element. The supporting section 3 is disposed on a back surface of the display section 2 by a connection member 4.

Figure 2:
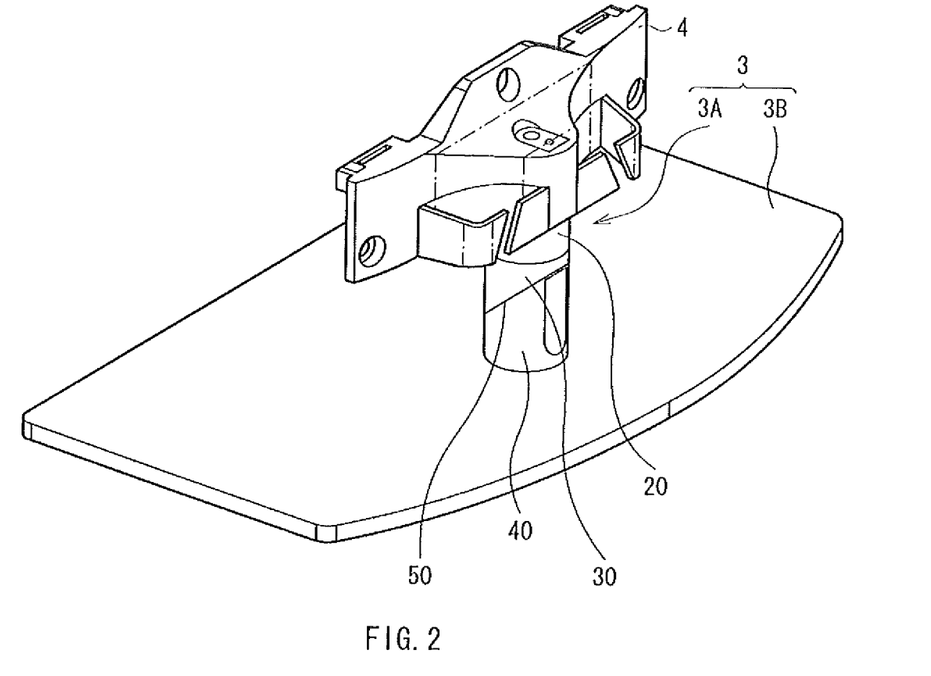
FIG. 2 is an enlarged perspective view of a supporting section of the display illustrated in FIG. 1.

FIG. 2 illustrates an enlarged view of the supporting section 3 and the connection member 4. The supporting section 3 includes a cylindrical post (neck) 3A. An end (a lower end) of the post 3A is fixed to a flat base 3B. The connection member 4 is mounted at the other end (an upper end) of the post 3A.

Figure 3:
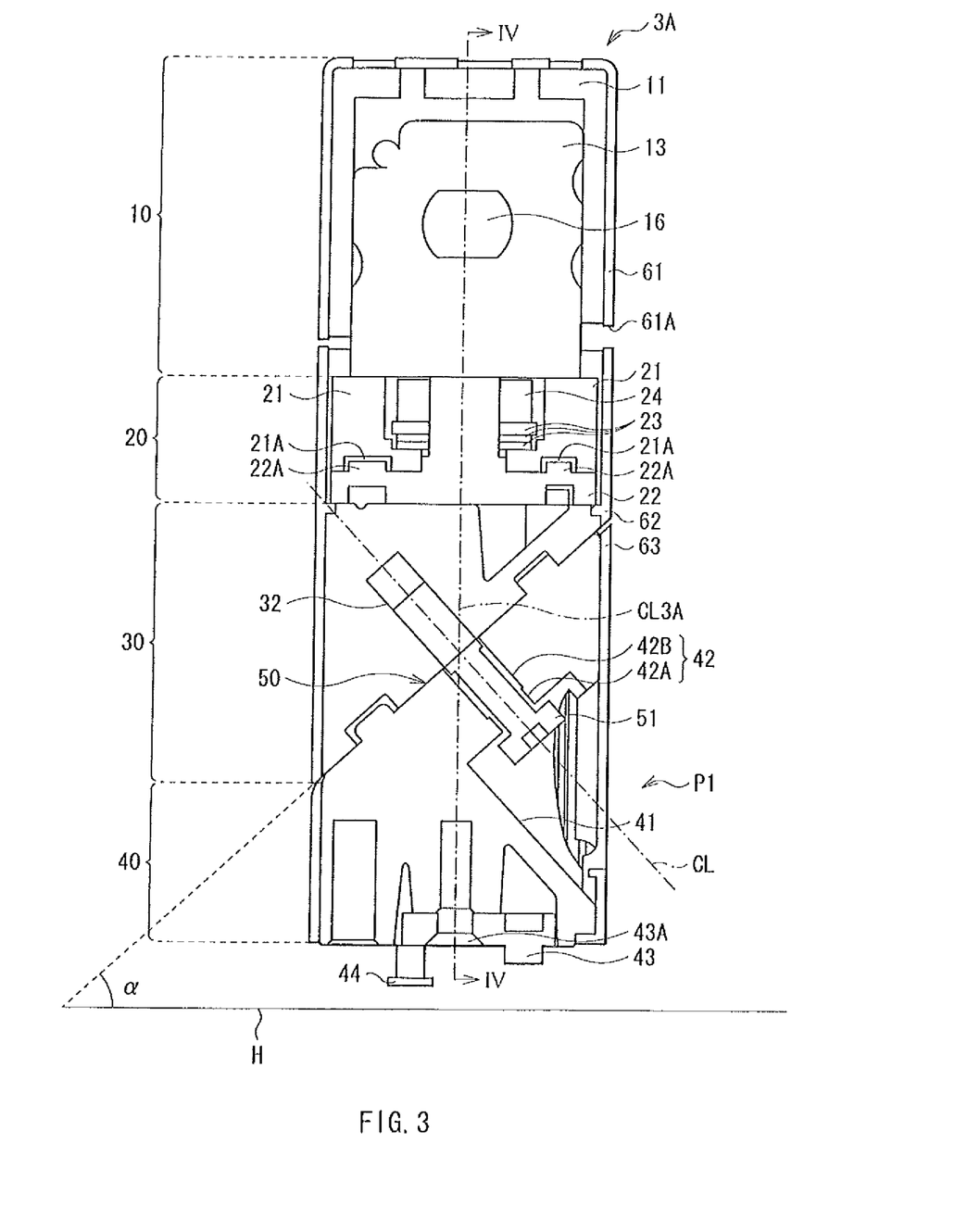
FIG. 3 is a sectional view illustrating a configuration of a post illustrated in FIG. 2.
Figure 4:
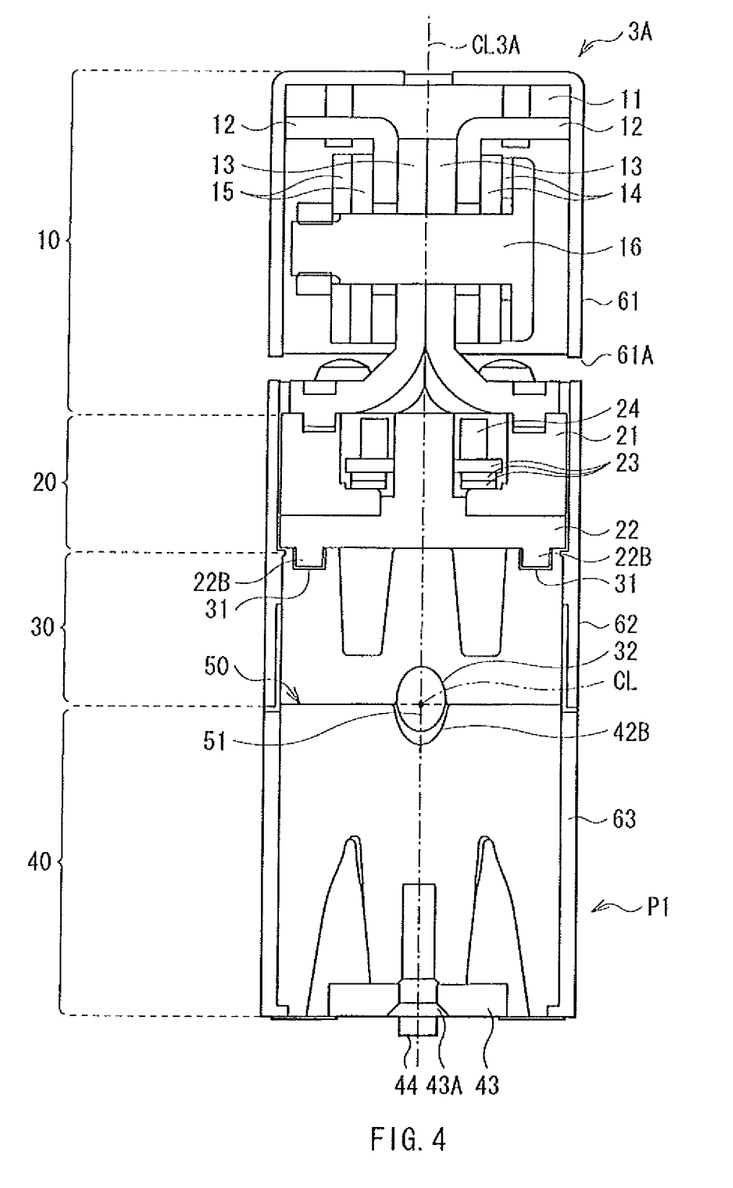
FIG. 4 is a sectional view taken along a line IV-IV of FIG. 3.

FIGS. 3 and 4 illustrate sectional configurations of the post 3A taken along a plane including a central line CL3A thereof. The post 3A includes, for example, a tilt mechanism 10, a swivel mechanism 20, an upper post 30 and a lower post 40 in order from the top. The upper post 30 and the lower post 40 are separated from each other at a separating plane 50, and are connected together by a screw 51.

Figure 5:
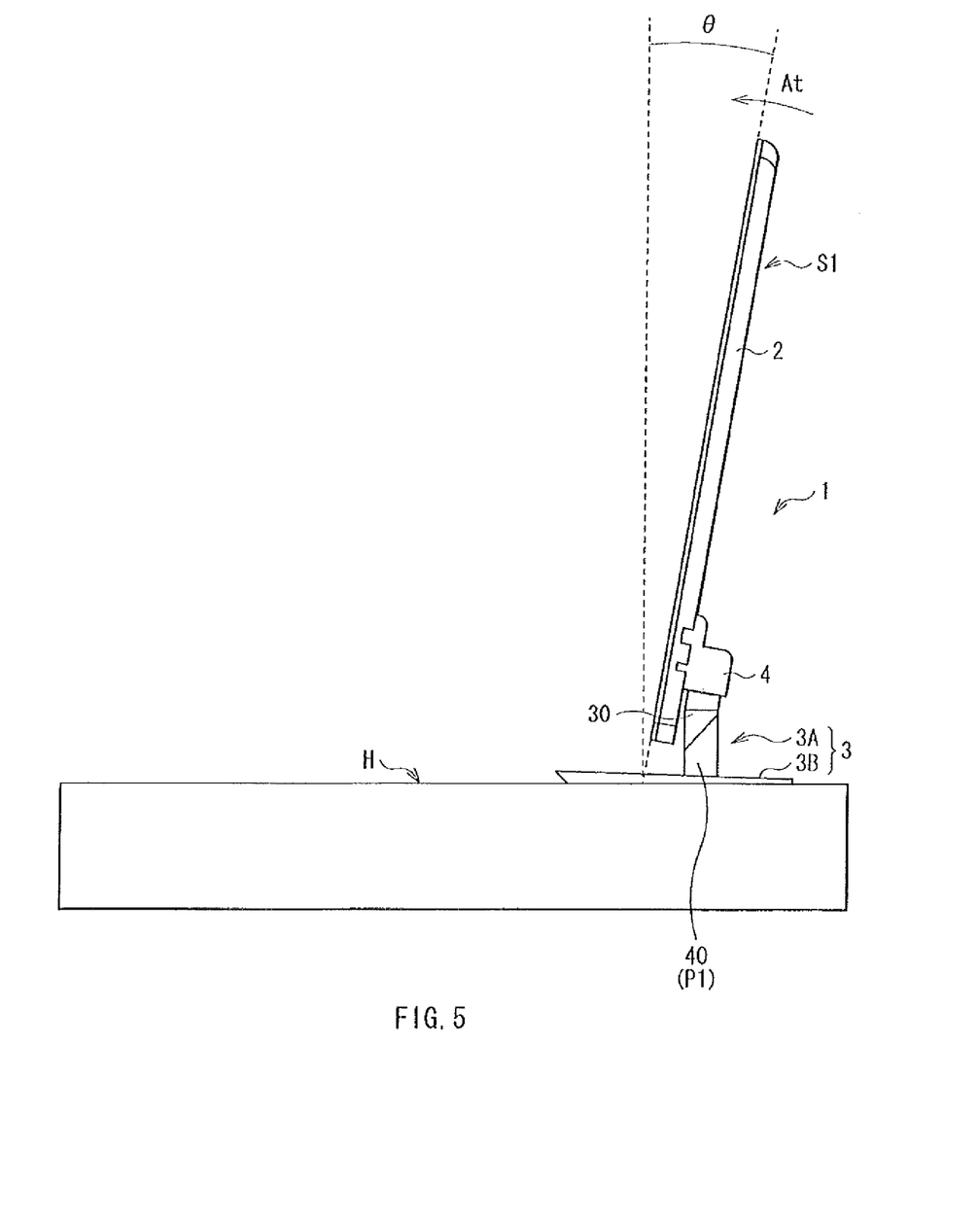
FIG. 5 is a side view illustrating an example of a tilt of a display section by a tilt mechanism illustrated in FIG. 2.
Figure 6:
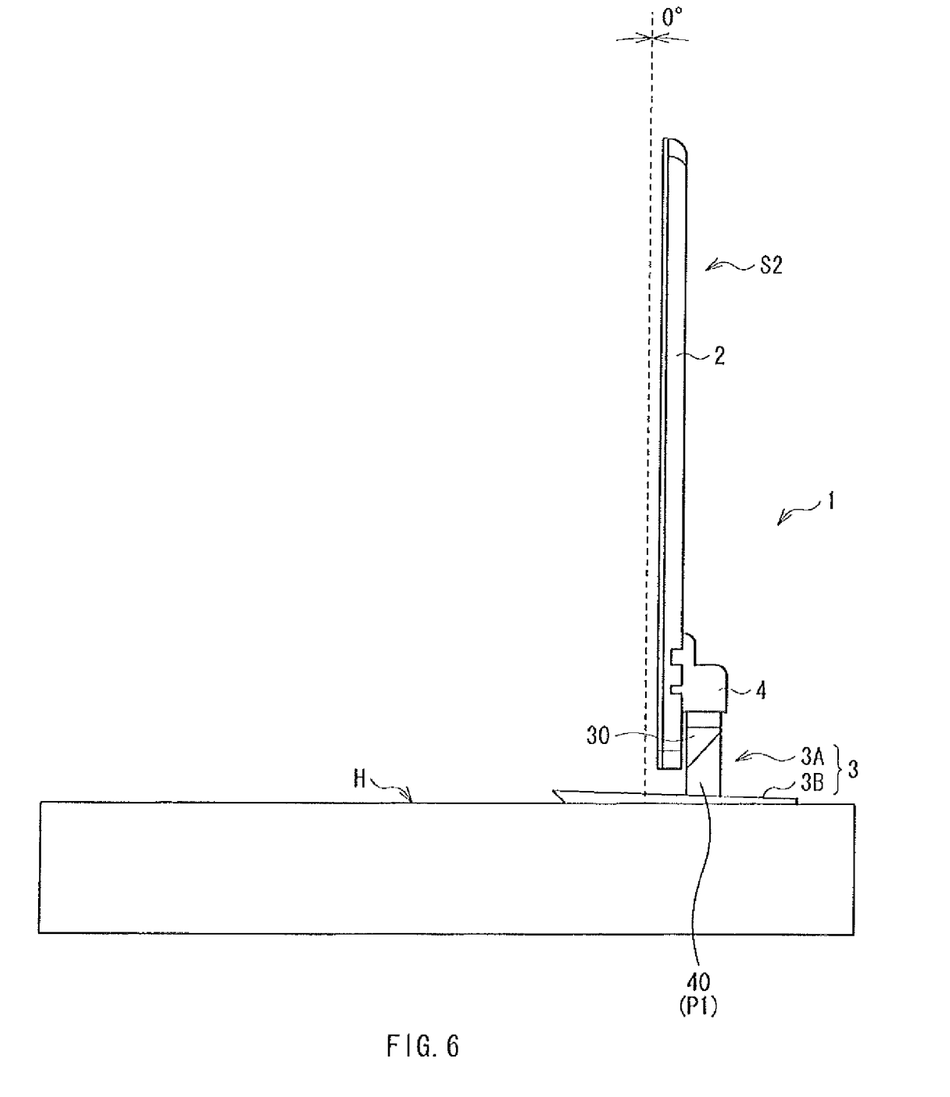
FIG. 6 is a side view illustrating another example of the tilt of the display section.

The tilt mechanism 10 is disposed on a side opposite to the separating plane 50 of the upper post 30 to change a tilt angle in an elevation direction of the display section 2. In other words, the display 1 is allowed to be changed, by the tilt mechanism 30, from an initial state S1, as illustrated in FIG. 5, where the display section 2 is tilted backward at a maximum tilt angle θ with respect to a horizontal plane H to a forward tilt state S2, as illustrated in FIG. 6, where the display section 2 is perpendicular (at a tilt angle of 0°) to the horizontal plane H by being tilted forward as indicated by an arrow At. For example, the maximum tilt angle θ (refer to FIG. 5) of the display section 2 by the tilt mechanism 10 is preferably approximately 6°. The tilt angle of the display section 2 may be changed between two angles, that is, the maximum tilt angle θ and 0°, or may be continuously variable (between the two angles).

For example, as illustrated in FIG. 4, the tilt mechanism 10 includes a tilt plate 11, two tilt brackets 12 with a L-shaped sectional surface and two tilt bases 13 with a L-shaped sectional surface in order from the top. Surfaces in a lateral direction of the tilt brackets 12 are fixed to the tilt plate 11. Surfaces in a longitudinal direction of the tilt bases 13 are sandwiched between surfaces in a longitudinal direction of the tilt brackets 12. A tilt shaft 16 penetrates through surfaces in the longitudinal direction of the tilt brackets 12 and the surfaces in the longitudinal direction of the tilt bases 13 with a tilt washer 14 and a wave washer 15 in between. Surfaces in the lateral direction of the tilt bases 13 are connected to an upper swivel plate 21 which will be described later of the swivel mechanism 20. Therefore, the tilt mechanism 10 is laterally rotatable with the display section 2 by the swivel mechanism 20.

The swivel mechanism 20 is disposed between the upper post 30 and the tilt mechanism 10, and as indicated by an arrow As in FIG. 1, the swivel mechanism 20 changes a rotation angle in a lateral direction of the display section 2. The swivel mechanism 20 has, for example, a configuration in which a ring-shaped upper swivel plate 21 and a lower swivel plate 22 with an inverted T-shaped sectional surface are fixed by a screw 24 with a washer 23 in between. The upper swivel plate 21 is a rotating component, and the lower swivel plate 22, the washer 23 and the screw 24 are fixed components. As illustrated in FIG. 3, the rotation amount of the upper swivel plate 21 (a swivel rotation angle of the display section 2) is specified by a dowel 22A disposed on an upper surface of the lower swivel plate 22 and an arc-shaped groove 21A disposed on a lower surface of the upper swivel plate 21. The lower swivel plate 22 is fixed to the upper post 30 by a screw (not illustrated). Moreover, as illustrated in FIG. 4, a dowel 22B for positioning with respect to a groove 31 of the upper post 30 is disposed on a lower surface of the lower swivel plate 22.

The upper post 30 is a cylindrical member extending in a direction perpendicular to the horizontal plane H, and is formed by, for example, aluminum die casting. A screw hole 32 allowing the screw 51 to be threaded therethrough is disposed in the upper post 30.

Figure 7:
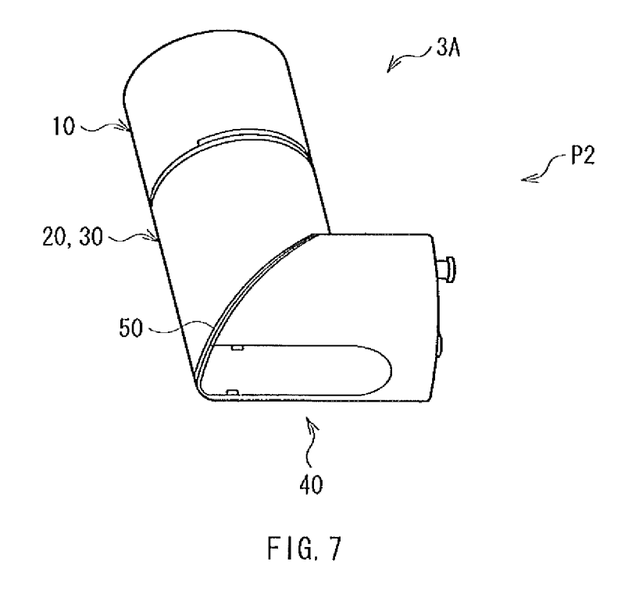
FIG. 7 is a perspective view illustrating a case where a mounting angle of a lower post illustrated in FIG. 2 with respect to an upper post is changed.
Figure 8:
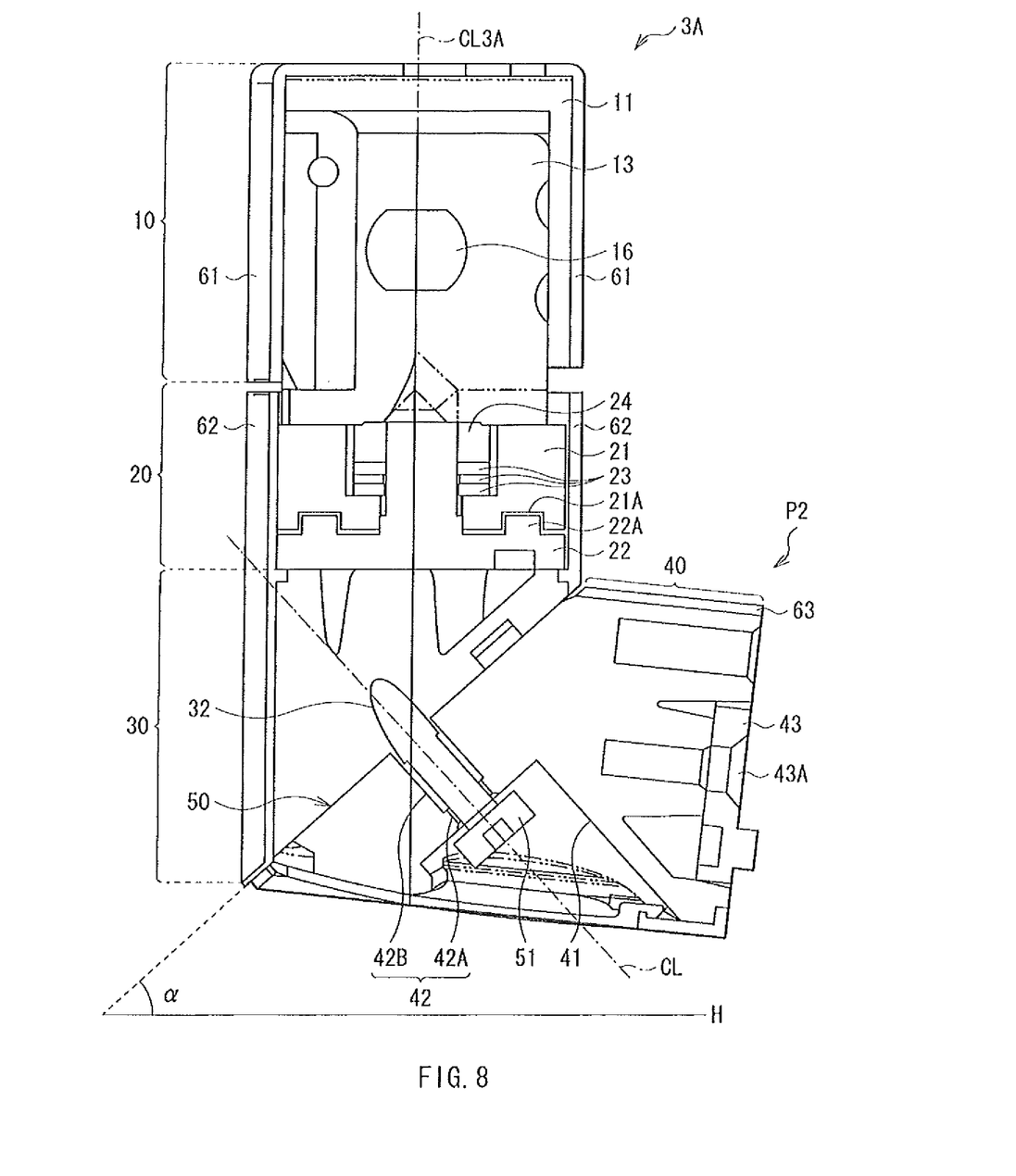
FIG. 8 is a sectional view of the posts illustrated in FIG. 7.

The lower post 40 is a cylindrical member formed by, for example, an aluminum die casting as in the case of the upper post 30. Moreover, the lower post 40 is separated from the upper post 30 at the separating plane 50 which is a plane tilted with respect to the horizontal plane H, and as illustrated in FIGS. 7 and 8, the mounting angle with respect to the upper post 30 of the lower post 40 is variable by rotating around a central line CL of the upper post 30 on the separating plane 50. The central line CL of the upper post 30 is a straight line which passes through an intersection of a central line CL3A of the post 3A and the separating plane 50 and is perpendicular to the separating plane 50. It is to be noted that a cutting plane in FIG. 8 is not a plane passing though the diameter of the post 3A, but the cutting plane forms a sector shape with a central angle of smaller than 180° when viewed from an end plane in a lengthwise direction of the post 3A.

More specifically, the lower post 40 rotates around the central line CL of the upper post 30 between a first position P1, as illustrated in FIGS. 3 and 4, where the upper post 30 and the lower post 40 form a straight line and a second position P2, as illustrated in FIGS. 7 and 8, where the upper post 30 and the lower post 40 form a line bent at the separating plane 50.

Figure 9:
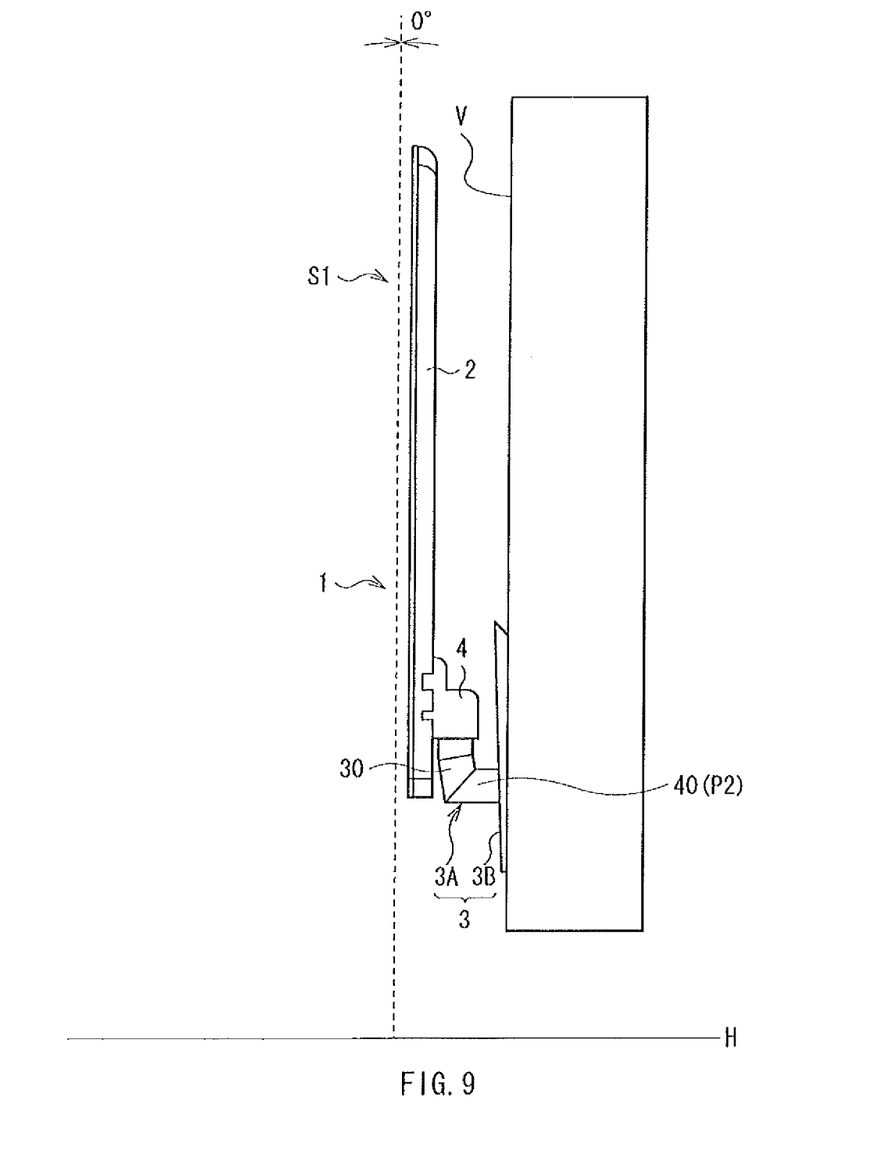
FIG. 9 is a side view illustrating an example of a tilt of the display section installed on a wall.
Figure 10:
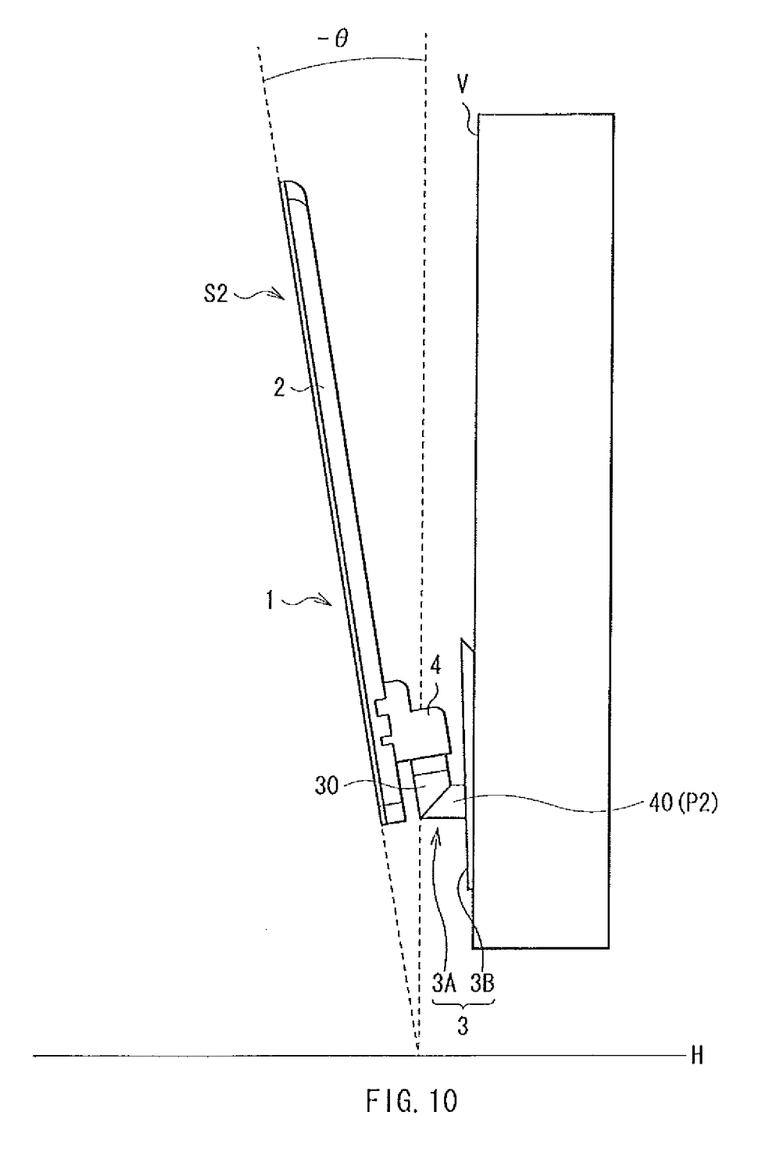
FIG. 10 is a side view illustrating another example of the tilt of the display section.

When the lower post 40 is at the first position P1, as illustrated in FIGS. 5 and 6, the display 1 is allowed to be installed as desktop installation by mounting the base 3B on the horizontal plane H. On the other hand, when the lower post 40 is at the second position P2, as illustrated in FIGS. 9 and 10, the display 1 is allowed to be used as wall-mount installation by mounting the base 3B on a vertical plane V with use of a lock mechanism such as a pulley (not illustrated). Therefore, the supporting section 3 is allowed to be used as a so-called variable stand serving as both of a stand for mounting the display section 2 on the horizontal plane H and a wall-mount bracket for mounting the display section 2 on the vertical plane V perpendicular to the horizontal plane H.

Moreover, as illustrated in FIGS. 3 and 8, a tilt angle α with respect to the horizontal plane H of the separating plane 50 satisfies α=45°−(θ/2), where θ is a maximum tilt angle of the display section 2 by the tilt mechanism 10. For example, in the case where the maximum tilt angle θ of the display section 2 is 6° as described above, the tilt angle α of the separating plane 50 is 42°. Therefore, the display 1 is convertible between wall-mount installation and desktop installation by simple work.

More specifically, a wall surface of an architectural structure is typically a vertical plane V perpendicular to a floor surface (the horizontal plane H); therefore, in the case where the tilt angle with respect to the horizontal plane H of the display section 2 is 0°, when the tilt angle α of the separating plane 50 is 45°, in wall-mount installation, the display section 2 is allowed to be parallel to the wall surface V. However, as illustrated in FIG. 5, when the tilt angle α of the separating plane 50 is 45° in the initial state S1 where the display section 2 is tilted backward at the maximum tilt angle θ with respect to the horizontal plane H, even in wall-mount installation, the display section 2 is tilted backward at the maximum tilt angle θ. Therefore, the display section 2 faces a ceiling, and to easily view a screen, it is necessary to execute an additional step of tilting the display section 2 to a direction parallel to the vertical plane V or to a downward direction with use of the tilt mechanism 10.

On the other hand, in the case where the display section 2 in the initial state S1 illustrated in FIG. 5 is tilted backward at the maximum tilt angle θ with respect to the horizontal plane H by setting the tilt angle α with respect to the horizontal plane H of the separating plane 50 to α=45°−(θ/2) as described above, when the display 1 is converted from desktop installation to wall-mount installation, as illustrated in FIG. 9, the tilt of the display section 2 is corrected to allow the display section 2 to be parallel (at a tilt angle of 0°) to the vertical plane (wall surface) V. The same applies in the case where the display 1 is converted back from wall-mount installation to desktop installation. Therefore, when the display 1 is converted from desktop installation to wall-mount installation, and vice versa, it is not necessary to adjust the tilt angle of the display section 2 with use of the tilt mechanism 10, thereby improving convenience by work simplification.

Further, as illustrated in FIG. 10, when the display section 2 is tilted forward at a maximum tilt angle −θ depending on a mounting position thereof to be changed to a forward tilt state S2, the screen is allowed to be viewed more easily.

As illustrated in FIG. 3, the lower post 40 includes a recess 41 and a through hole 42 which both allow the screw 51 to be threaded therethrough in a position corresponding to the screw hole 32 of the upper post 30. The through hole 42 has a screw portion 42A in proximity to an inlet for the screw 51, and a portion other than the screw portion 42A is a free hole 42B. Therefore, in the case where the screw 51 is loosened to change the mounting direction of the lower post 40, the screw 51 is kept in the through hole 42 while being engaged in the screw portion 42A. Therefore, the screw 51 is allowed to be tightened again in the screw hole 32 immediately after changing the mounting direction of the lower post 40, thereby further simplifying work. Moreover, the screw 51 is less likely to fall from the through hole 42, thereby preventing a drop, loss or the like of the screw 51.

It is to be noted that a bottom plate 43 is mounted on a lower end of the lower post 40 by a screw 43A. Moreover, a dowel 44 for temporary fixation to the base 3B is disposed on the lower end of the lower post 40 to prevent the lower post 40 from falling over.

A tilt cover 61, a central cover 62 and a lower cover 63 which are made of a metal or a resin are disposed on an external surface of the post 3A illustrated in FIGS. 3, 4 and 8. The tilt mechanism 10 is contained in the tilt cover 61. The swivel mechanism 20 and the upper post 30 are contained in the central cover 62. The lower post 40 is coated with the lower cover 63. The tilt cover 61 includes a clearance groove 61A for preventing an interference with the central cover 62 in the case where the display section 2 is tilted.

Figure 11:
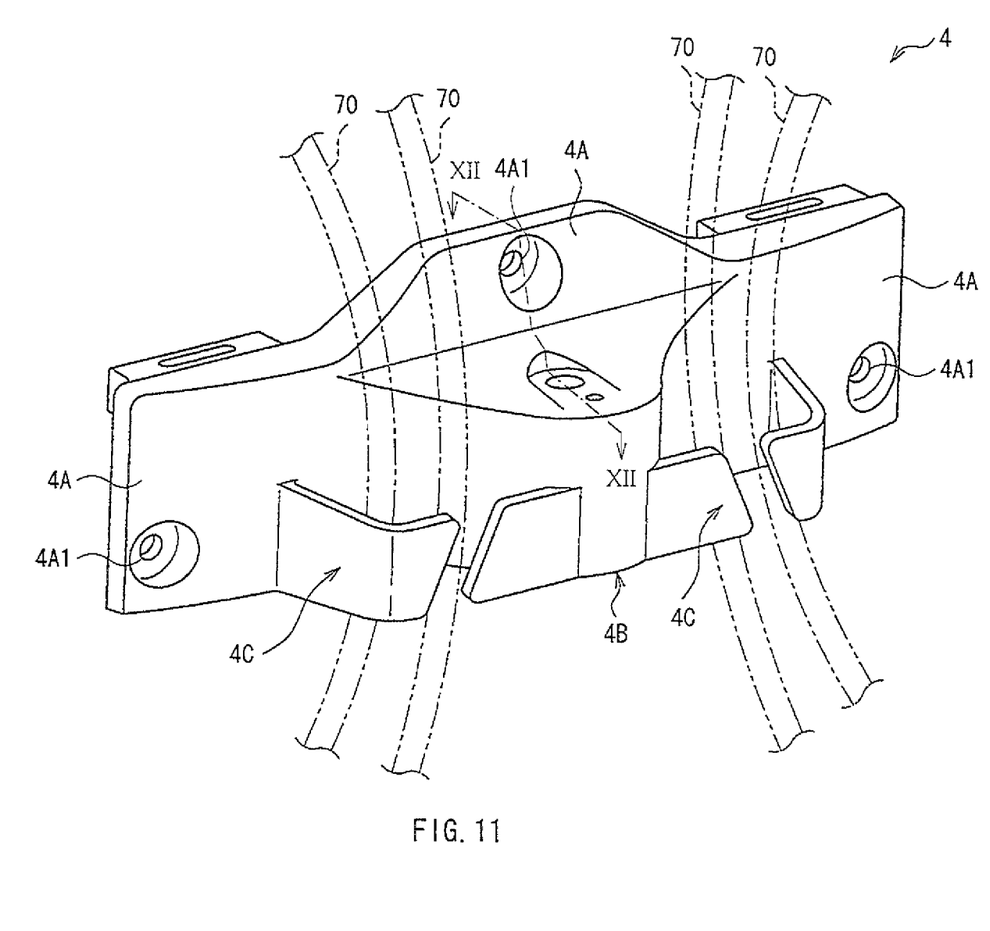
FIG. 11 is a perspective view illustrating a configuration of a connection member illustrated in FIG. 2.
Figure 12:
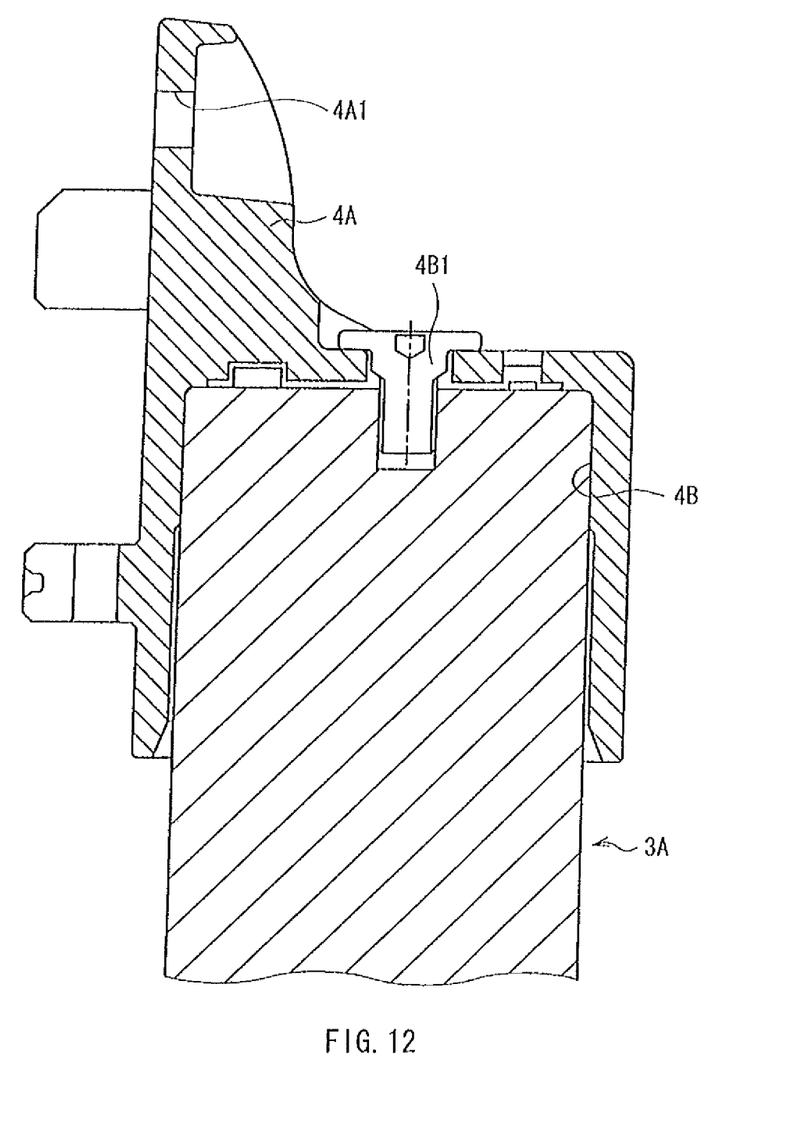
FIG. 12 is a sectional view taken along a line XII-XII of FIG. 11.

The connection member 4 illustrated in FIG. 2 connects the display section 2 to the supporting section 3. For example, as illustrated in FIGS. 11 and 12, the connection member 4 has a fixing section 4A fixed to the display section and a hole 4B allowing an upper end of the post 3A to be contained therein and fixed thereto. In the fixing section 4A, for example, screw holes 4A1 are disposed at, for example, three points. An upper end surface of the post 3A is fixed to the hole 4B by a screw 4B1 or the like. If necessary, cable holding sections 4C for holding cables 70 may be disposed on both sides of the hole 4B.

In the display 1, the screw 51 is loosened to loosen connection between the lower post 40 and the upper post 30, and the lower post 40 rotates around the central line CL of the upper post 30 on the separating plane 50 to change the mounting angle with respect to the upper post 40, and then the lower post 40 is fixed to the upper post 30 by the screw 51.

More specifically, as illustrated in FIGS. 3 and 4, in the case where the lower post 40 is at the first position P1 where the upper post 30 and the lower post 40 form a straight line, as illustrated in FIGS. 5 and 6, the display 1 is allowed to be installed as desktop installation by mounting the base 3B on the horizontal plane H. On the other hand, as illustrated in FIGS. 7 and 8, in the case where the lower post is at the second position P2 where the upper post 30 and the lower post 40 form a line bent at the separating plane 50, as illustrated in FIGS. 9 and 10, the display 1 is allowed to be used as wall-mount installation by mounting the base 3B on the vertical plane V with use of a lock mechanism such as a pulley (not illustrated). Thus, the supporting section 3 is allowed to be used as a so-called variable stand serving as both of a stand for mounting the display section 2 on the horizontal plane H and a wall-mount bracket for mounting the display section 2 on the vertical plane V perpendicular to the horizontal plane H.

Moreover, the tilt angle α with respect to the horizontal plane H of the separating plane 50 satisfies $\alpha = 45° - (\theta/2)$, where θ is the maximum tilt angle of the display section 2 by the tilt mechanism 10; therefore, as illustrated in FIG. 5, when the display 1 is converted, in the initial state S1 where the display section 2 is tilted backward at the maximum tilt angle θ with respect to the horizontal plane H, from the desktop installation to wall-mount installation, as illustrated in FIG. 9, the tilt of the display section 2 is corrected to be parallel (at a tilt angle of 0°) to the wall surface V. On the other hand, as illustrated in FIG. 9, when the display 1 is converted from wall-mount installation to desktop installation while the display section 2 is parallel (at a tilt angle of 0°) to the wall surface V, as illustrated in FIG. 5, the display section 2 is changed to the initial state S1 where the display section 2 is tilted backward at the maximum tilt angle θ with respect to the horizontal plane H. Accordingly, when the display 1 is converted from desktop installation to wall-mount installation, and vice versa, it is not necessary to adjust the tilt angle of the display section 2 with use of the tilt mechanism 10, thereby simplifying work to improve convenience.

Thus, in the embodiment, the post 3A is separated into the upper post 30 and the lower post 40 at a plane tilted with respect to the horizontal plane H, and the mounting angle with respect to the upper post 30 of the lower post 40 is variable, and the tilt angle α with respect to the horizontal plane of the separating plane 50 satisfies $\alpha = 45° - (\theta/2)$, where θ is the maximum tilt angle of the display section 2 by the tilt mechanism 10; therefore, the display 1 is convertible between wall-mount installation and desktop installation by simple work, and a variable stand with high convenience is achieved.

Although the present technology is described referring to the above-described embodiment, the technology is not limited thereto, and may be variously modified. For example, in the above-described embodiment, the case where the maximum tilt angle θ of the display section 2 is 6° is described for ease of description; however, a tilt operation at any tilt angle θ is achievable by the same mechanism.

Moreover, in the above-described embodiment, a flat television is described as the display 1; however, the technology is not limited to televisions, and is applicable to any other electronic device such as a monitor for a personal computer, a display for a car navigation system or a digital photo frame. Further, the technology is widely applicable to a structure, such as a painting or a signboard, including a flat plate-like object-to-be-supported and a supporting section with a base and a post.

It should be understood by those skilled in the art that various modifications, combinations, sub-combinations and alterations may occur depending on design requirements and other factors insofar as they are within the scope of the appended claims or the equivalents thereof.

What is claimed is:

1. A display comprising:
a display section configured to display images; and
a supporting section including a post and a base supporting the display section,
wherein the post includes:
a tubular upper post;
a tubular lower post separated from the upper post at a separating plane tilted with respect to a horizontal plane and having a variable mounting angle with respect to the upper post by rotating around a central line of the upper post on the separating plane; and a tilt mechanism disposed on a side of the separating plane having the upper post and enabling a change in a first tilt angle in an elevation direction of the display section, in which the supporting section is configured to be both a stand for mounting the display section on the horizontal plane and a wall-mount bracket for mounting the display section on a vertical plane perpendicular to the horizontal plane, in which the separating plane is tilted with respect to the horizontal plane by a second tilt angle ($\alpha$), and in which a maximum value of the first tilt angle and a value of the second tilt angle $\alpha$ are such that the supporting section is able to be converted from the stand for mounting the display section on the horizontal plane to the wall-mount bracket for mounting the display section on the vertical plane or visa-versa without having to adjust the first tilt angle by use of the tilt mechanism in order to allow the display images on the display section to be viewable by a user, in which the second tilt angle $\alpha=45°-(\theta/2)$, where $\theta$ represents a maximum value of the first tilt angle of the display section which is enabled by the tilt mechanism and has a value of 6 degrees such that the second tilt angle $\alpha$ has a value of 42 degrees.

2. The display according to claim 1, wherein the lower post rotates around the central line of the upper post between a first position and a second position, position, in the first position the upper post and the lower post form a straight line, in the second position the upper post and the lower post are angled relative to one another at the separating plane.

3. The display according to claim 2, wherein a swivel mechanism changing a rotation angle in a lateral direction of the display section is provided between the upper post and the tilt mechanism.

4. The display according to claim 3 further comprising:

a connection member connecting the display section to the supporting section, wherein the connection member has a fixing section fixed to the display section, and a hole allowing an upper end of the post to be contained therein and fixed thereto.

5. A display apparatus comprising:

a connecting member configured to enable an image display device to be mounted thereto; and a supporting section couplable to the connecting member, said supporting section having a post and a base, said base configured to be mounted on a horizontal surface or a vertical surface which is perpendicular to the horizontal surface, in which the supporting section is configured to be both a stand for mounting the image display device on the horizontal surface and a wall-mount bracket for mounting the display section on the vertical surface, and in which the post includes a tubular upper post, a tubular lower post separated from the upper post at a separating plane, and a tilt mechanism disposed on a side of the separating plane having the upper post which enables the image display device to be tilted by a first tilt angle, in which the upper post and the lower post are rotatable relative to each other on the separating plane, and in which the separating plane is tilted with respect to the horizontal surface by a second tilt angle ($\alpha$), in which a maximum value of the first tilt angle and a value of the second tilt angle $\alpha$ are such that the supporting section is able to be converted from the stand for mounting the display section on the horizontal plane to the wall-mount bracket for mounting the display section on the vertical plane or visa-versa without having to adjust the first tilt angle by use of the tilt mechanism in order to allow the display images on the display section to be viewable by a user, in which the second tilt angle $\alpha=45°-(\theta/2)$, where $\theta$ represents a maximum value of the first tilt angle of the display section which is enabled by the tilt mechanism and has a value of 6 degrees such that the second tilt angle $\alpha$ has a value of 42 degrees.

\* \* \* \* \*